United States Patent [19]

Kimura

[11] 4,433,349
[45] Feb. 21, 1984

[54] BIAS CONTROL APPARATUS FOR A RECORDING SYSTEM

[75] Inventor: Kenji Kimura, Tokyo, Japan

[73] Assignee: Olympus Optical Co., Ltd., Tokyo, Japan

[21] Appl. No.: 282,074

[22] Filed: Jul. 10, 1981

[30] Foreign Application Priority Data

Jul. 17, 1980 [JP] Japan .................. 55-97824

[51] Int. Cl.³ .................. G11B 5/47; G11B 27/36
[52] U.S. Cl. ........................... 360/66; 360/31
[58] Field of Search .................. 360/66, 65, 67, 68, 360/27, 31

[56] References Cited

U.S. PATENT DOCUMENTS

| | | | |
|---|---|---|---|
| 4,247,875 | 1/1981 | Takahashi | 360/25 |
| 4,253,122 | 2/1981 | Tabata | 360/66 |
| 4,258,397 | 3/1981 | Kitamura et al. | 360/25 |
| 4,279,005 | 7/1981 | Kitamura et al. | 360/66 |

Primary Examiner—Vincent P. Canney

Attorney, Agent, or Firm—Frishauf, Holtz, Goodman & Woodward

[57] ABSTRACT

A bias control apparatus for a tape recorder includes a signal source circuit for generating first and second signals, a bias signal generating circuit for providing a composite bias signal containing a frequency component of the second signal, a recording circuit for recording into a recording tape a recording current corresponding to the composite bias signal and the first signal, a playback circuit for taking out a third signal from said recording tape, the third signal containing a signal component corresponding to the first and second signals, a detecting circuit for detecting a fourth signal corresponding to an amplitude component of the second signal from the third signal in synchronism with the second signal, and a control means for changing a magnitude of the composite bias signal on the basis of the fourth signal. The bias signal generating circuit, the recording circuit, the playback circuit, the detecting circuit, and the control circuit cooperatively make up a servo loop for controlling the composite bias signal to have a given magnitude.

24 Claims, 9 Drawing Figures

BIAS CONTROL APPARATUS FOR A RECORDING SYSTEM

BACKGROUND OF THE INVENTION

The present invention relates to a bias control apparatus for automatically controlling a bias voltage to an optimum bias voltage in a tape recorder for recording an analog signal on a magnetic tape.

In a tape recorder for recording an analog signal, for example, an audio signal, a given bias current is applied to the recording head. A magnitude of the bias current is selected such that a single tone from 400 Hz to 1 kHz is recorded at a recording level, for example, from −20 dB to −30 dB with respect to a saturation level of magnetic tape used, and the bias current is adjusted so as to have a maximum of a playback output level of the single tone. The magnitude of the bias current so controlled is called a peak bias or an optimum bias current. The magnitude of the optimum bias current depends on an electric-magnetism converting characteristic of the magnetic tape, a characteristic of the recording head, a transporting speed of the tape, and other conditions of the measurement. Wear of a tape sliding portion of the head often causes the width of a head gap to change and/or a cross sectional area of the head core to reduce. As a result, a reluctance in the magnetic circuit of the recording head and an impedance of the magnetic head gradually change in the course of the use of the tape recorder. Therefore, even when the bias voltage applied to the recording head is fixed, a bias magnetic field around the head gap changes with wear of the head. Thus, the magnitude of the optimum bias current changes also by the wear of the recording head through its use.

As described above, the optimum bias current changes depending on a variety of conditions as mentioned above. In order to record the audio signal always under a good condition, it is desirable to make the control for the optimum base current, before the recording. A known method of the bias control is categorized into a manual method by the rotation of a variable resistor and an automatic method by using a microprocessor. Both the methods make use of the fact that a maximum point (peak bias point) in the level of the reproduced single tone or a point in the vicinity of the peak bias point corresponds to the optimum bias point. When making use of this principle, little difficulty is encountered in the manual bias control method but much difficulty is encountered in the automatic bias control method. The difficulty is that when a playback level is below the maximum point of the playback level, the judgement must be made as to whether the small playback level is due to an over-bias or an under-bias. To solve this problem, the conventional automatic bias control device using the microprocessor adopts a relatively complicated control process.

Much study was made to find a simpler, more reliable automatic bias control method for the optimum bias current which may be substituted for the complicated digital control by the microprocessor, and the present invention have succeeded in finding a servo system which can automatically control the bias current to the optimum value.

SUMMARY OF THE INVENTION

Accordingly, the present invention has an object to provide a bias control apparatus which can automatically find an optimum bias in a record/playback system.

To achieve the above object, the present invention obtains the optimum bias point or the peak bias point by using plural kinds of signals with different frequencies. A playback signal component of a second signal which is superposed on a first signal and amplitude-modulates the bias current, has an extreme value in its amplitudes and opposite phases in the under-bias and the over-bias states which are with respect to the peak bias. An embodiment of the present invention judges whether the bias is the under-bias state or the over-bias state by making use of this phenomenon of the playback signal component. The present invention further forms a servo loop to effectively find the peak bias point by making use of a feature of the playback signal component that, at the peak bias point, the amplitude of the playback signal component has a minimum and the frequency of the playback signal component is doubled.

BRIEF DESCRIPTION OF THE DRAWINGS

Other objects and features of the present invention will be apparent from the following description taken in connection with the accompanying drawings, in which.

DETAILED DESCRIPTION OF THE PREFERRED EMBODIMENTS

Figure 1:
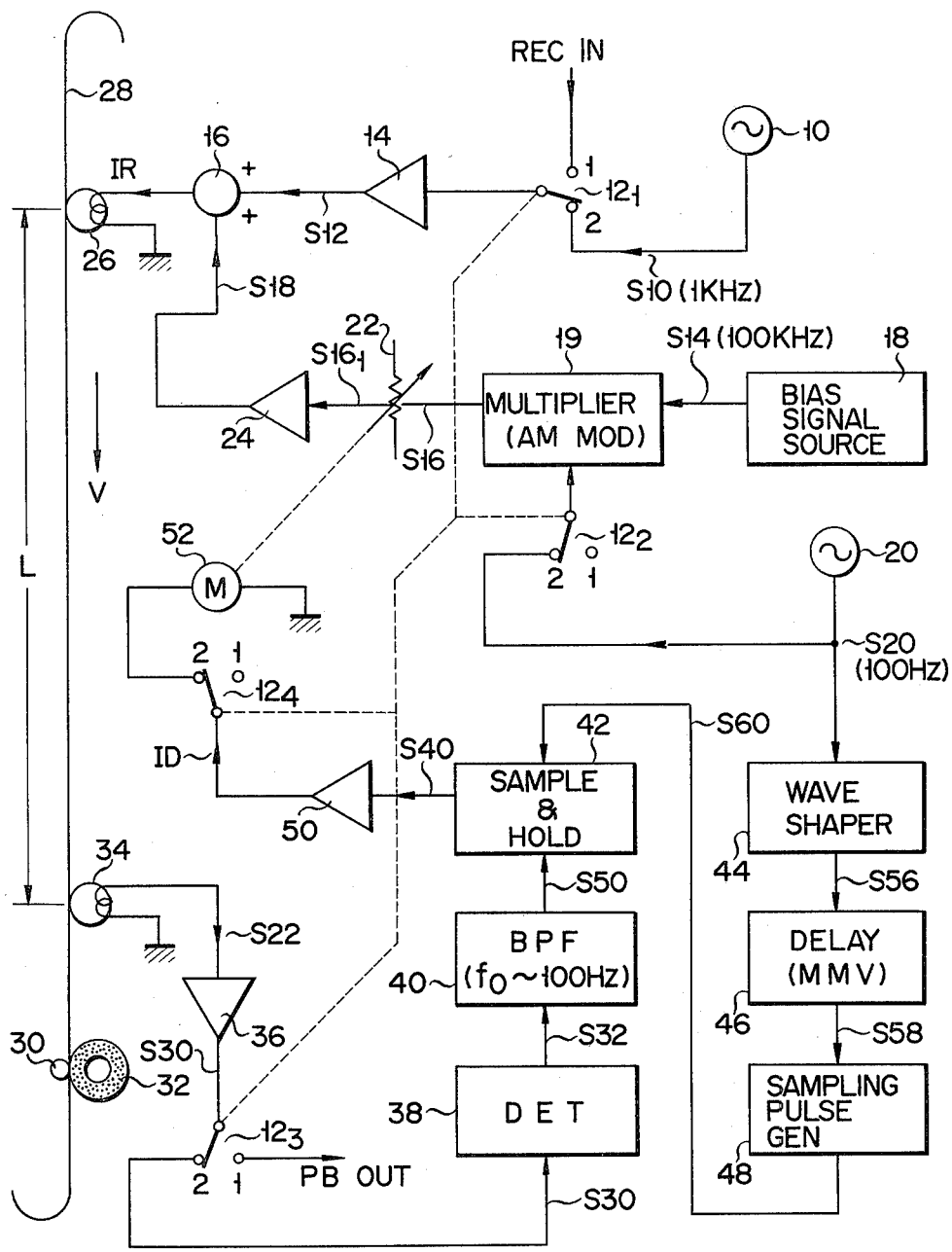
FIG. 1 shows a block diagram a bias control apparatus according to an embodiment of the present invention.

Before proceeding with the description of the embodiments of the invention, it will expressly be understood that like reference symbols are used to destinate like portions throughout the drawings for simplicity of illustration and that the components destinated by like reference symbols may easily be replaced with each other or one another with minor change thereof by a skilled person in the art. An embodiment of a bias control apparatus for a recording system according to the invention will be described. FIG. 1 shows a leading portion of a tape recorder containing a bias control apparatus according to the present invention. The construction and operation of the automatic bias control section of the tape recorder will be described with omission of explanation of general record/playback operation. To obtain the optimum bias, a first signal S10 is generated from a first signal source 10. The signal S10 is inputted to a record amplifier 14, through a second contact of a switch $12_1$. In the present embodiment, a sinusoidal wave oscillator with an oscillating frequency of 1 kHz is used for the signal source 10. A recording signal S12 outputted from the amplifier 14 is inputted into a mixer 16.

A bias signal S14 for providing a recording bias current, which is generated from a bias signal source 18, is applied to a multiplying circuit 19. A sinusoidal wave oscillator with the oscillating frequency of 100 kHz is used in the present embodiment. A second signal S20, generated from a second signal source 20, is applied to the multiplying circuit 19, through a second contact of a switch $12_2$. A sinusoidal wave oscillator for oscillating a frequency of 100 Hz is used for the signal source 20. The second signal S20 is multiplied by the bias signal S14 in the circuit 19. In other words, the second signal S20 is amplitude-modulated by the signal S14. A composite signal S16 formed of the signals S14 and S20, derived from the multiplying circuit 19, is inputted, as an attenuated signal $S16_1$ to a bias amplifier 24 by way of a potentiometer 22. The amplifier 24 amplifies the signal $S16_1$ to produce a composite bias signal S18 in the order of several tens volt. The composite bias signal S18 is mixed with the recording signal S12 in the mixer 16 to become a recording current IR. The current IR is applied to a recording head 26. Composite information of the first signal S10 (1 kHz) and the second signal S20 (100 Hz) is recorded into a magnetic tape (recording medium) 28 with a bias current (100 kHz) contained in the current IR.

The mixer 16 may be a multiplier or a mere analog composer.

The magnetic tape 28 is transported at a given speed V by the aid of the combination of a capstan 30 and a pinch roller 32. The composite information of the first signal S10 and the second signal S20 is reproduced by a playback head 34. Let an interval between the gaps of the heads 26 and 34 be L. The composite information recorded by the head 26 is played back or reproduced by the head 34 after the elapse of time L/V. Assuming that the heads 26 and 34 form the record/playback (REC/PLAY) combination head, L=4.8 mm, and V=2.4 cm/S, the information recorded by the head 26 is detected by the head 34 after 200 mS. A playback signal S22 detected by the head 34 is applied to a playback amplifier 36. The signal S22 is frequency-compensated and amplified by the amplifier 36 and is produced as a third signal S30.

The third signal S30 has a waveform of the composite signal of the first signal S10 (1 kHz) and the second signal S20 (100 Hz). The signal S30 is applied through the second contact of a switch $12_3$ to a detecting circuit 38 where it is detected. A detected signal S32 containing a positive envelope (100 Hz) of the signal S30, for example, is produced from the detecting circuit 38. The signal S32 is inputted into a band-pass filter (BPF) 40. The BPF 40 extracts a frequency component of the second signal S20 from the signal S32 to produce a fifth signal S50 corresponding to the second signal S20. The signal S50 is inputted into a sample/hold circuit 42.

When the signal S30 is a mere sum signal of the first signal S10 and the second signal S20, that is, the first signal S10 is not amplitude-modulated by the second signal S20, the third signal S30 is directly applied to the BPF 40. When the mixer 16 has a function of the amplitude-modulation, that is, the first signal S10 is amplitude-modulated by the second signal S20, the detecting circuit 38 is necessary.

The second signal S20 is applied to a wave shaping circuit 44. The wave shaping circuit 44 wave-shapes the signal S20 into a signal S56 with a square wave of which the rise and fall times are fast. The signal S56 is delayed a given time by a delay circuit 46. The circuit 46 may be comprised of a monostable multivibrator having a given time constant. The given time delay by the circuit 46 is so selected as to be equal to the time L/V + a phase shift amount of the signal S30 in the amplifier 36 and the like. A delay signal S58 outputted from the delay circuit 46 is inputted into a sampling pulse generator 48 where it is converted into a sixth pulsate signal S60. The generator 48 may be constructed of a one-shot multivibrator with a small time constant which is triggered at the leading edge of the signal S58, for example. The pulse width of the sixth signal S60 is determined by a time constant of the one-shot pulse generator 48. The sixth signal S60 is applied to the sample/hold circuit 42. The sample/hold circuit 42 samples the fifth signal S50 at the generating timing of the sixth signal S60 and holds the sampled signal S50 till the next sampling. The signal S50 sampled and held by the circuit 42 is outputted as a fourth signal S40. In order to prevent a jitter of the signal S30 arising from a flutter or the like in the tape transporting system, the sampling period for the signal S50, i.e. the period of the sixth signal S60, is preferably selected to be approximately two times or more a frequency modulation period or a phase modulation period (a period of jitter) of the third signal S30. Generally, approximately 100 Hz for the frequency of the second signal S20 substantially satisfies the just-mentioned requirement. For example, when the jitter frequency for causing the jitter is 1 kHz, if the frequency of the second signal S20 is 100 Hz, the influence by the jitter is almost negligible.

The fourth signal S40 is inputted into a current amplifier 50 which applies a drive current ID with a magnitude proportional to the signal S40 to a motor 52, through the second contact of a switch $12_4$. The motor 52 used in the embodiment is a DC reversible motor of which the rotating direction and the rotating amount are dependent on a direction (polarity) and a magnitude of the current ID. A shaft of the motor 52 is mechanically coupled with said potentiometer 22. Accordingly, an amount of the amplitude of the composite signal $S16_1$ changes depending on a magnitude and a polarity of the fourth signal S40. In other words, a magnitude of the bias current (corresponding to signal S14 or S18) applied to the recording head 26 changes in accordance with the fourth signal S40.

Figure 2:
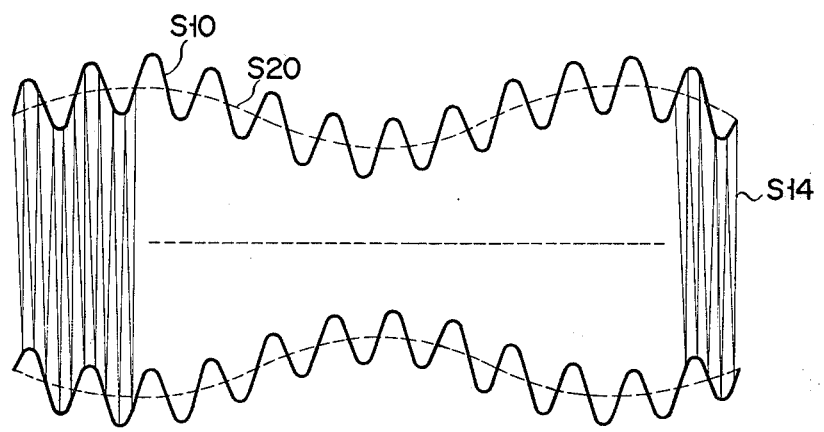
FIG. 2 is a graphical representation of a waveform of a recording current in the arrangement shown in FIG. 1.
Figure 3:
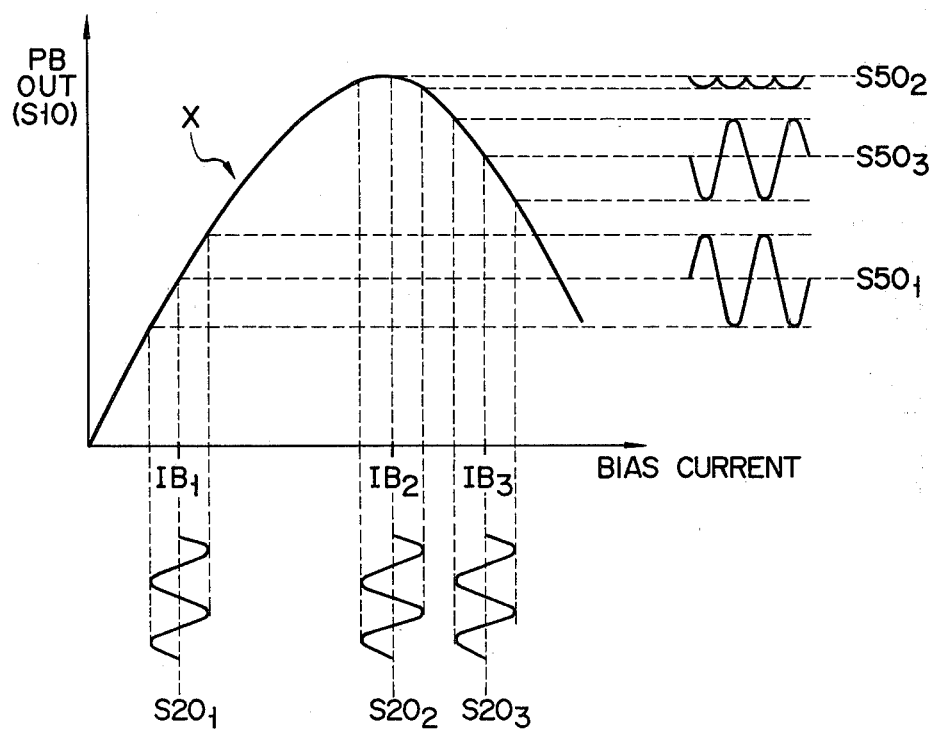
FIG. 3 shows waveforms for illustrating a playback level change of a first signal S10 and a waveform change of a fifth signal S50 when a bias current is changed in the arrangement of FIG. 1.

The operation of the arrangement shown in FIG. 1 will be described referring to FIGS. 2 to 4. FIG. 2 shows a waveform of the recording current IR. As shown, in the waveform of the current IR, the composite signal of the first signal S10 (1 kHz) and the second signal S20 (100 Hz) is superposed on the envelope of the bias signal S14 (100 Hz). FIG. 3 shows a relationship between a magnitude of a bias current corresponding to the bias signal S14 vs. an output level of a playback output corresponding to the first signal S10. As well known, the playback output level changes depending on the magnitude of the bias current and reaches a maximum at the peak bias point (a point of the bias current $IB_2$).

A curve X in FIG. 3 illustrates how a playback output level corresponding to the first signal S10 changes when the bias current not modulated by the second signal S20 changes. Let us consider a case where a signal $S20_1$ (100 Hz) corresponding to the second signal S20 is contained with the playback output at a bias current $IB_1$ in the under-bias state. In this state, the BPF 40 in FIG. 1 produces a fifth signal $S50_1$ (100 Hz) relating to the bias current $IB_1$. Conversely, for a bias current $IB_3$ in an over-bias state, a signal $S20_3$ is contained, the BPF 40 produces a signal $S50_3$ (100 Hz) relating to the current $IB_3$. On the other hand, at the bais current $IB_2$ being in a peak bias state, a signal $S20_2$ is contained, the BPF 40 produces a signal $S50_2$ (200 Hz) relating to the current $IB_2$.

FIG. 3 shows electrical phenomena on which the present invention is based. As seen, as the bias current approaches from the under-bias state ($IB_1$) to the peak bias state ($IB_2$), the amplitude of the fifth signal S50 changes from the large amplitude ($S50_1$) to the small amplitude ($S50_2$). When the bias current passes the peak bias state ($IB_2$) and enters the over-bias state, the amplitude of the fifth signal changes from the small amplitude ($S50_2$) to the large amplitude ($S50_3$). FIG. 3 shows also the following important features:

(1) The signal $S50_1$ in the under-bias state and the signal $S50_3$ in the over-bias state are out of phase.

(2) At the peak bias, the amplitude of the signal $S50_2$ is minimized and its frequency is doubled as if it is full-wave rectified.

The feature in (1) enables one to judge whether the bias state at that time is under-bias state or over-bias state. The feature in (2) determines the peak bias point, or the optimum bias point. In FIG. 3, the waveform of the signal $S50_2$ is exaggeratedly illustrated for better understanding. In fact, however, the BPF 40 with the central frequency fo of 100 Hz substantially filters out 200 Hz which is a major frequency component of the signal $S50_2$.

Figure 4:
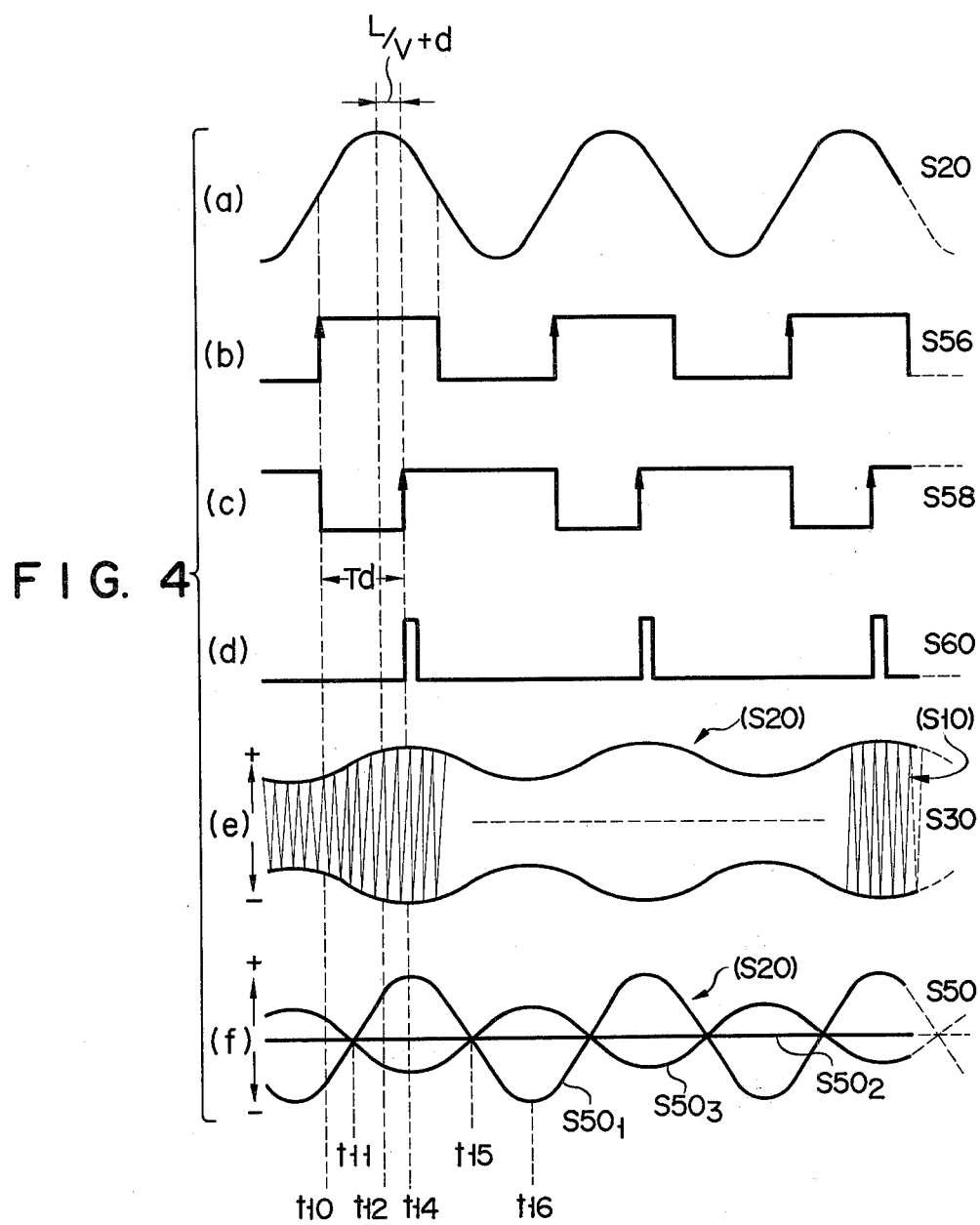
FIGS. 4(a) to 4(f) cooperatively form a timing chart useful in explaining the operation of the arrangement shown in FIG. 1.

FIG. 4 shows a timing chart useful in explaining how a bias control according to the present invention is carried out on the basis of the above two phenomena (1) and (2). FIG. 4(a) shows a second signal S20 to be inputted into the wave shaping circuit 44. The wave shaping circuit 44 converts the signal S20 into a rectangular wave signal S56 as shown in FIG. 4(b). As shown in FIG. 4(c), the delay circuit 46 is triggered by the leading edge of the signal S56 at time t10. When triggered, the circuit 46 produces a delayed signal S58 having logical "0" portions each for a given delay time Td. After the time Td from the trigger of the circuit 46, the signal S58 rises at time t14. In response to the signal S58, the sampling pulse generator 48 produces the sixth signal S60 as shown in FIG. 4(d).

The third signal S30 produced from the playback amplifier 36 includes the first signal S10 (1 kHz) enveloped by the second signal S20 (100 Hz). As seen from the comparison of the waveforms shown in FIGS. 4(a) and 4(e), there is a time difference (phase difference) L/V +d between the second signal S20 before recorded (t12) and that contained in the third signal S30 as the reproduced signal (t14). As previously stated, the term L/V is a time delay defined by the gap interval L and the tape transporting speed V. The other term d indicates a phase delay caused by a reproduced frequency compensation in the amplifier 36, etc.

The third signal S30 shown in FIG. 4(e) is detected (rectified) by the detecting circuit 38, so that only the positive signal component, for example, of the signal S30 is inputted as the detected signal S32 to the BPF 40. Since the central frequency fo of the BPF 40 is approximately 100 Hz, only the second signal component (S20) in the signal S32 is allowed to pass through the BPF 40 and the first signal component (S10) is prohibited from passing through the BPF 40. Therefore, the fifth signal S50 from the BPF 40 corresponds to only the second signal S20. The waveform of the fifth signal S50 changes in accordance with the bias value, as described referring to FIG. 3. As shown in FIGS. 4(e) and 4(f), in the under-bias state, the fifth signal S50 is a fifth signal $S50_1$ which is in phase with the positive envelope of the signal S30. The signal $S50_1$ is sampled at time t14 at which the sixth signal S60 is generated, the sample/hold circuit 42 produces a fourth signal S40 with a DC level proportional to a positive potential of the signal $S50_1$. The signal S40 is amplified by the amplifier 50 and is applied as the positive drive current ID to the motor 52. In response to the current ID, the motor 52 is forwardly rotated to rotate the potentiometer 22 in a level-up direction. As a result, the bias current (100 kHz) supplied to the recording head 26 is increased.

Conversely, in the over-bias state, the fifth signal S50 is a fifth signal $S50_3$ which is out of phase with respect to the envelope of the signal S30. When this signal $S50_3$ is sampled at time t14, the sample/hold circuit 42 produces a fourth signal S40 with a DC level proportional to a negative potential of the signal $S50_3$ at the time t14. The signal S40 is supplied as a negative drive current ID to the motor 52. As a result, the motor 52 is reversely rotated to rotate the potentiometer 22 in a level-down direction. The result is decrease of the bias current supplied to the recording head 26. The components 22, 24, 16, 26, 34, 36, 38, 40, 42, 50 and 52 cooperatively form a servo loop closed through the magnetic tape 28. The servo loop operates so as to zero the fourth signal S40. When the bias current settles down to the peak bias point as indicated by the bias current $IB_2$ in FIG. 3 through the operation of the servo loop, the second signal component (S20) at 100 Hz disappears in the signal S30 or S32, so that the fifth signal $S50_2$ becomes zero. Accordingly, a potential of the signal S40 after the sampling at time t14 is zero, and the drive current ID to the motor 52 is also zero. Thus, at the peak bias, the motor 52 is not rotated and the bias current is not changed.

Figure 5:
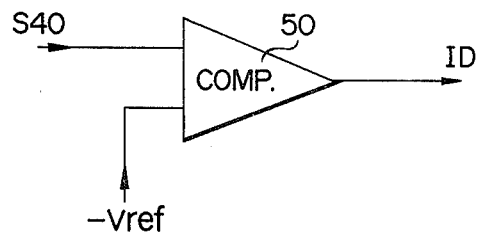
FIGS. 5 to 9 are block and circuit diagrams of modifications of some of the components in the arrangement shown in FIG. 1.

The arrangement shown in FIG. 1 forms a servo system for controlling the bias current to a given value ($IB_2$). The control target in the servo control depends on the zero potential of the signal S40. When the control target is set to a bias current slightly larger than the peak bias current, all one has to do is, for example, to apply a proper rotational (control target) $-V_{ref}$ to the amplifier (comparator) 50, as shown in FIG. 5. In this case, when the potential of the fourth signal S40 becomes negative and is equal to the comparing potential $-V_{ref}$ (i.e. in a prescribed over-bias state), the current ID becomes zero.

The sampling of the fifth signal S50 must be carried out at a point other than nodes of times t11 and t15 in FIG. 4(f). When the sampling is made at such node, the magnitude of the fourth signal S40 is not changed even if the bias current changes, and therefore no servo operation is performed. It is at a center point between the adjacent nodes that the most effective servo operation is allowed. Therefore, the most preferable point for the sampling is in the vicinity of time t14 or time t16. The delay circuit 46 in FIG. 1 is provided to shift the time point of the sampling by the sixth signal S60 to the center or its near point. Between the samplings of time t14 and time t16, the phases in the servo loop are opposite to each other.

After the optimum bias current ($IB_2$) is obtained by the servo operation, the bias current must be held. In the arrangement shown in FIG. 1, this is realized by turning the switches 12₁ to 12₄ of the two-contact four-gang type switches from the second contact to the first contact. When the switch 12₄ is turned to the first contact, the motor 52 is not rotated and the potentiometer 22 is also fixed. When the switch 12₂ is turned to the first contact, the bias signal S14 is not modulated by the second signal S20 in the multiplying circuit 19. Accordingly, the composite bias signal S18 is a bias signal with a single frequency equal to the frequency, 100 kHz, of the signal S14. Under this condition, a recording signal is inputted and recorded through the first contact of the switch 12₁, while a playback signal is derived from the first contact of the switch 12₃.

Figure 6:
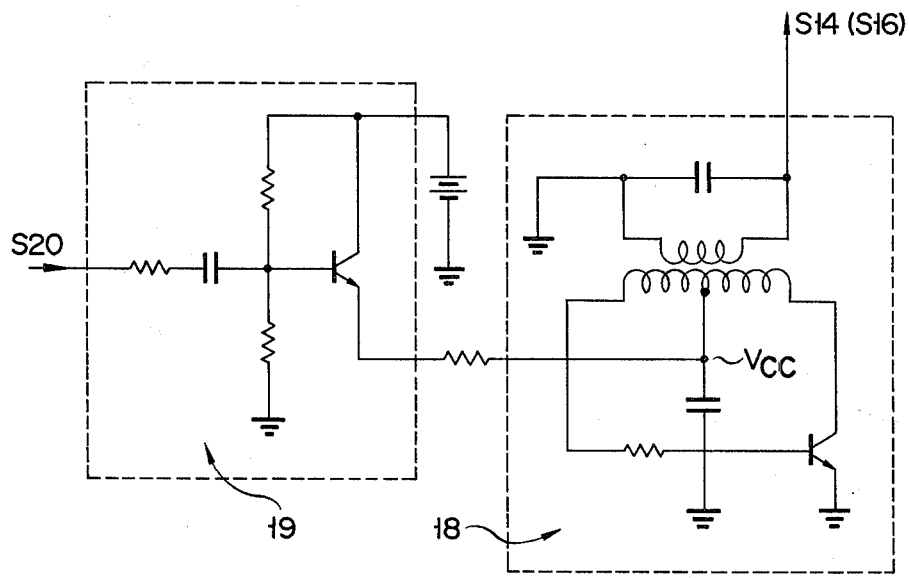
Figure 7:
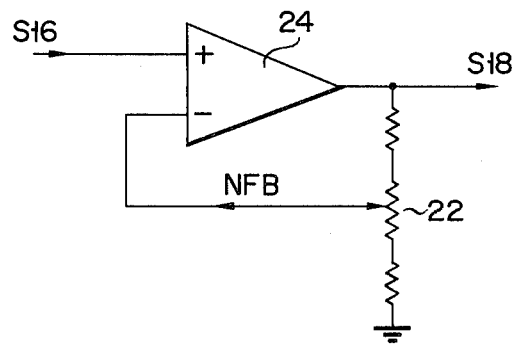
Figure 8:
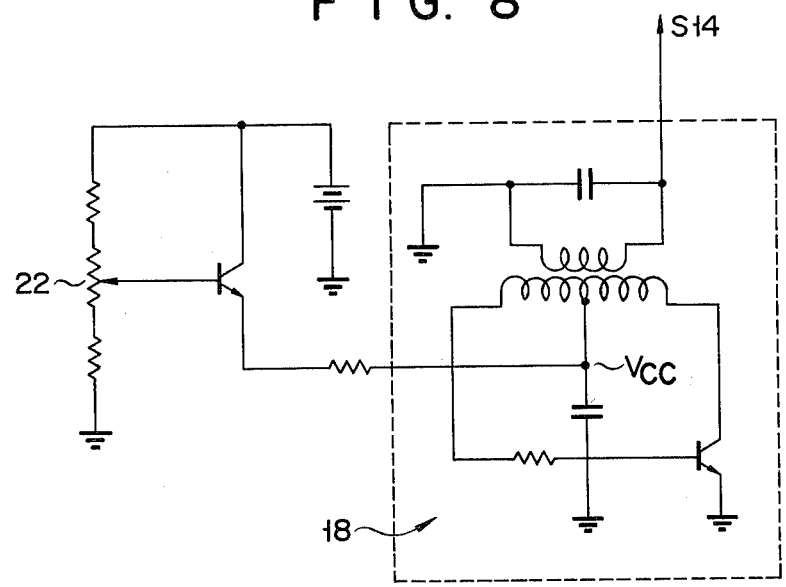

While a preferred embodiment of the invention has been described using specific terms, such description is for illustrative purposes only, and it is to be understood that changes and variations may be made without departing from the spirit and scope of the following claims. For example, the multiplying circuit 19 may be replaced by an arrangement that the bias signal source 18 is amplitude-modulated by the second signal source 20. Such an arrangement is shown in FIG. 6 in which a supply voltage $V_{CC}$ to the signal source 18 or the bias oscillator is modulated by the second signal S20. The potentiometer 22 may be provided between the bias signal source 18 and the multiplication circuit 19 or in the NFB loop (FIG. 7) of the bias amplifier 24. Furthermore, the supply voltage to the bias signal source 18 may be changed by means of the potentiometer 22 (FIG. 8).

Figure 9:
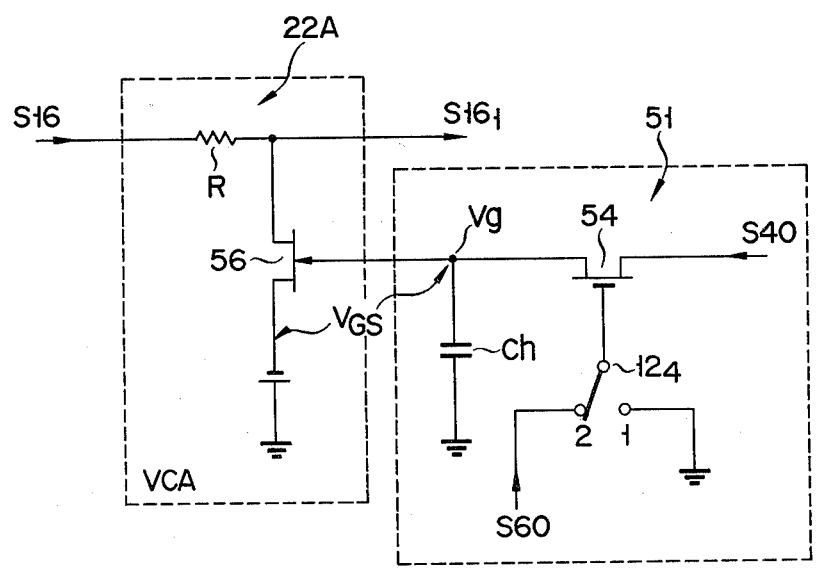

In FIG. 1, the control means for controlling the magnitude of the bias current is constructed of the combination of the DC reversible motor 52 and the potentiometer 22. This may be replaced of the combination of a voltage memory circuit and a VCA (voltage controlled attenuator). For example, as shown in FIG. 9, the voltage memory circuit 51 may be constructed by properly combining a hold capacitor Ch with extremely small leakage and a transfer gate comprised of a MOS FET 54. The VCA 22A may be constructed by making use of a fact that the internal impedance of an FET 56 changes in accordance with its gate-source voltage $V_{GS}$. Applied to the gate of the FET 56 is a control voltage Vg stored in the capacitor Ch. The VCA 22A is comprised of the FET 56 and a resistor R, and the attentuation ratio is determined by the magnitude of the control voltage Vg. Alternatively, after the fourth signal S40 may be subjected to an A/D conversion and the result of the A/D conversion may be stored in a digital memory (RAM). A level of the bias signal S14, or a magnitude of the composite bias signal S18, is changed in accordance with the output data from the RAM. The frequencies of first signal S10, second signal S20 and bias signal S14 in the above-mentioned embodiment may be selected proper values, respectively. Additionally, the waveforms of first signal S10 and second signal S20 are not necessarily the sinusoidal waveforms. For example, use of a triangle wave also enables a servo operation for automatically obtaining the optimum bias point.

What is claimed is:

1. A bias control apparatus for a recording system, comprising:

(a) signal source means for generating a first signal and a second signal, the frequency of said first signal being different from that of said second signal and the envelope of said first signal corresponding to said second signal;

(b) bias signal generating means coupled to said signal source means for providing a composite bias signal containing a frequency component of said second signal and another frequency component at a frequency higher than that of said frequency component of said second signal;

(c) recording means coupled to said bias signal generating means and to said signal source means for recording information of said composite bias signal and said first signal into a recording medium;

(d) playback means coupled through said recording medium to said recording means for taking out a third signal containing a signal component corresponding to said first and second signals from said recording medium;

(e) detecting means coupled to said playback means for detecting a fourth signal corresponding to the amplitude component of said second signal from said third signal; and (f) control means coupled to said detecting means and to said bias signal generating means for changing a magnitude of said composite bias signal based on said fourth signal;

said bias signal generating means, said recording means, said playback means, said detecting means and said control means cooperatively forming a servo loop for controlling said composite bias signal to a given magnitude.

2. A bias control apparatus for a recording system, comprising:

(a) signal source means for generating a first signal and a second signal, the frequency of said first signal being different from that of said second signal and the envelope of said first signal corresponding to said second signal;

(b) bias signal generating means coupled to said signal source means for providing a composite bias signal containing a frequency component of said second signal and another frequency component at a frequency higher than that of said frequency component of said second signal;

(c) recording means coupled to said bias signal generating means and to said signal source means for recording information of said composite bias signal and said first signal into a recording medium;

(d) playback means coupled through said recording medium to said recording means for taking out a third signal containing a signal component corresponding to said first and second signals from said recording medium;

(e) detecting means coupled to said playback means for detecting a fourth signal corresponding to the amplitude component of said second signal from said third signal;

(f) control means coupled to said detecting means and to said bias signal generating means for changing a magnitude of said composite bias signal based on said fourth signal;

said bias signal generating means, said recording means, said playback means, said detecting means and said control means cooperatively forming a servo loop for controlling said composite bias signal to a given magnitude; and (g) holding means coupled to said control means for shutting off said servo loop after said composite bias signal reaches said given magnitude and for holding said composite bias signal of said given magnitude after said servo loop is shut off.

3. An apparatus of claim 1 or 2, wherein said detecting means includes:
  filter means for frequency-separating from said third signal a fifth signal with a frequency component corresponding to the frequency of said second signal;
  sampling signal generating means coupled to said signal source means for generating a sixth signal in synchronism with said second signal; and
  sample/hold means coupled to said sampling signal generating means and to said filter means for sampling and holding an amplitude of said fifth signal at the time of the generation of said sixth signal.

4. An apparatus of claim 3, wherein said sampling signal generating means includes signal delay means for delaying said second signal such that said sixth signal is phase-delayed behind said second signal by a given amount of delay, whereby the sampling of said sample/hold means is performed at the time that said fifth signal is substantialy at the maximum amplitude.

5. An apparatus of claim 1 or 2, wherein said bias signal generating means includes:
  a bias signal oscillator for generating a bias signal with a higher frequency than those of said first and second signals; and
  amplitude-modulating means coupled to said bias signal oscillator and to said signal source means for amplitude-modulating said bias signal by said second signal to provide said composite bias signal.

6. An apparatus of claim 3, wherein said bias signal generating means includes:
  a bias signal oscillator for generating a bias signal with a higher frequency than those of said first and second signals; and
  amplitude-modulating means coupled to said bias signal oscillator and to said signal source means for amplitude-modulating said bias signal by said second signal to provide said composite bias signal.

7. An apparatus of claim 4, wherein said bias signal generating means includes:
  a bias signal oscillator for generating a bias signal with a higher frequency than those of said first and second signals; and
  amplitude-modulating means coupled to said bias signal oscillator and to said signal source means for amplitude-modulating said bias signal by said second signal to provide said composite bias signal.

8. An apparatus of claim 5, wherein said recording means includes second amplitude-modulating means for amplitude-modulating said composite bias signal by said first signal to provide said information to be recorded.

9. An apparatus of claim 5, wherein said recording means includes a mixer for analogously mixing said composite bias signal and said first signal to provide said information to be recorded.

10. A bias control apparatus for a tape recorder, comprising:
  (a) a first signal source for generating a first signal;
  (b) a second signal source for generating a second signal;
  (c) a bias signal source for generating a bias signal;
  (d) first means coupled to said bias signal source and to said second signal source for composing said second signal and said bias signal to provide a composite bias signal;
  (e) second means coupled to said to first means and said first signal source for recording composite information of said composite bias signal and said first signal into a magnetic tape;
  (f) third means coupled to said second means through said magnetic tape for playing back from said magnetic tape a third signal corresponding to said first and second signals;
  (g) fourth means coupled to said third means for extracting from said third signal a detected signal with a frequency corresponding to the frequency of said second signal;
  (h) fifth means coupled to said second means for providing a sampling pulse synchronized with said second signal and phase-delayed behind said second signal;
  (i) sixth means coupled to said fourth and fifth means for sampling and holding the amplitude component of said detected signal at the generating timing of said sampling pulse to provide a sampled signal corresponding to said second signal; and
  (j) seventh means coupled to said first and sixth means for changing a magnitude of said composite bias signal in accordance with a magnitude of said sampled signal so that said sampled signal reaches a given magnitude.

11. An apparatus of claim 10, wherein said first means includes amplitude-modulating means for providing said composite bias signal by amplitude-modulating said bias signal by said second signal.

12. An apparatus of claim 11, wherein said amplitude-modulating means includes a multiplier.

13. An apparatus of claim 11, wherein said bias signal source includes an oscillator power-supplied with a power source voltage, and said amplitude-modulating means includes means for changing said power source voltage according to said second signal.

14. An apparatus according to any one of claim 10, 11, 12 or 13, wherein said second means includes a second amplitude-modulating means for providing said composite information by amplitude-modulating said composite bias signal by said first signal.

15. An apparatus according to any one of claim 10, 11, 12 or 13, wherein said second means includes a mixer for providing said composite information by analogously composing said composite bias signal and said first signal.

16. An apparatus according to any one of claims 12, 11, 12 or 13, wherein said seventh means includes:
  drive means for providing a drive current with a magnitude corresponding to that of said sampled signal;
  an actuator coupled to said drive means and which is actuated in accordance with a magnitude and a current directionof said drive current; and
  attenuator means coupled to said actuator and to said first means for changing a magnitude of said composite bias signal in accordance with an operating state of said actuator.

17. An apparatus according to any one of claims 10, 11, 12 or 13, wherein said seventh means includes:
  voltage memory means responsive to said sampling pulse and to said sampled signal for storing a control voltage with a magnitude corresponding to said sampled signal at the generating timing of said sampling pulse; and
  attenuator means coupled to said voltage memory means and to said first means for changing a magnitude of said composite bias signal in accordance with a magnitude of said control voltage.

18. A bias control apparatus for a recording system comprising:
(a) signal source means for generating a first signal and a second signal, the frequency of said first signal being different from that of said second signal;
(b) bias signal generating means coupled to said signal source means for providing a composite bias signal containing a frequency component of said second signal and another frequency component at a frequency higher than that of said frequency component of said second signal;
(c) recording means coupled to said bias signal generating means and to said signal source means for recording information of said composite bias signal and said first signal into a recording medium;
(d) playback means coupled through said recording medium to said recording means for taking out a third signal containing a signal component corresponding to said first and second signals from said recording medium;
(e) detecting means coupled to said playback means for detecting a fourth signal corresponding to the amplitude component of said second signal from said third signal; and
(f) control means coupled to said detecting means and to said bias signal generating means for changing a magnitude of said composite bias signal based on said fourth signal;
said detecting means including:
filter means for frequency-separating from said third signal a fifth signal with a frequency component corresponding to the frequency of said second signal;
sampling signal generating means coupled to said signal source means for generating a sixth signal in synchronism with said second signal; and
sample/hold means coupled to said sampling signal generating means and to said filter means for sampling and holding an amplitude of said fifth signal at the time of the generation of said sixth signal; and
said bias signal generating means, said recording means, said playback means, said detecting means and said control means cooperatively forming a servo loop for controlling said composite bias signal to a given magnitude.

19. A bias control apparatus for a recording system, comprising:
(a) signal source means for generating a first signal and a second signal, the frequency of said first signal being different from that of said second signal;
(b) bias signal generating means coupled to said signal source means for providing a composite bias signal containing a frequency component of said second signal and another frequency component at a frequency higher than that of said frequency component of said second signal;
(c) recording means coupled to said bias signal generating means and to said signal source means for recording information of said composite bias signal and said first signal into a recording medium;
(d) playback means coupled through said recording medium to said recording means for taking out a third signal containing a signal component corresponding to said first and second signals from said recording medium;
(e) detecting means coupled to said playback means for detecting a fourth signal corresponding to the amplitude component of said second signal from said third signal;
(f) control means coupled to said detecting means and to said bias signal generating means for changing a magnitude of said composite bias signal based on said fourth signal;
said detecting means including:
filter means for frequency-separating from said third signal a fifth signal with a frequency component corresponding to the frequency signal of said second signal;
sampling signal generating means coupled to said signal source means for generating a sixth signal in synchronism with said second signal; and
sample/hold means coupled to said sampling signal generating means and to said filter means for sampling and holding an amplitude of said fifth signal at the time of the generating of said sixth signal;
said bias signal generating means, said recording means, said playback means, said detecting means and said control means cooperatively forming a servo loop for controlling said composite bias signal to a given magnitude; and
(g) holding means coupled to said control means for shutting off said servo loop after said composite bias signal reaches said given magnitude and for holding said composite bias signal at said given magnitude after said servo loop is shut off.

20. An apparatus of claim 18 or 19, wherein said sampling signal generating means includes signal delay means for delaying said second signal such that said sixth signal is phase delayed behind said second signal by a given amount of delay, thereby the sampling of said sample/hold means is performed at the time that said fifth signal is substantially at the maximum amplitude.

21. An apparatus of claim 18 or 19, wherein said bias signal generating means includes:
a bias signal oscillator for generating a bias signal with a higher frequency than those of said first and slecond signals; and
amplitude-modulating means coupled to said bias signal oscillator and said signal source means for amplitude-modulating said bias signal by said second signal to provide said composite bias signal.

22. An apparatus of claim 20, wherein said bias signal generating means includes:
a bias signal oscillator for generating a bias signal with a higher frequency than those of said first and second signals; and
amplitude-modulating means coupled to said bias signal oscillator and said signal source means for amplitude-modulating said bias signal by said second signal to provide said composite bias signal.

23. A bias control apparatus for a recording system, comprising:
(a) signal source means for generating a first signal and a second signal, the frequency of said first signal being different from that of said second signal;
(b) bias signal generating means coupled to said signal source means for providing a composite bias signal containing a frequency component of said second signal and another frequency component at a frequency higher than that of said frequency component of said second signal;

(c) recording means coupled to said bias signal generating means and to said signal source means for recording information of said composite bias signal and said first signal into a recording medium;

(d) playback means coupled through said recording medium to said recording means for taking out a third signal containing a signal component corresponding to said first and second signals from said recording medium;

(e) detecting means coupled to said playback means for detecting a fourth signal corresponding to the amplitude component of said second signal from said third signal; and (f) control means coupled to said detecting means and to said bias signal generating means for changing a magnitude of said composite bias signal based on said fourth signal; said bias signal generating means including:

a bias signal oscillator for generating a bias signal with a higher frequency than those of said first and second signals; and amplitude-modulating means coupled to said bias signal oscillator and said signal source means for amplitude-modulating said bias signal by said second signal to provide said composite bias signal; and said recording means including second amplitude-modulating means for amplitude-modulating said composite bias signal by said first signal to provide said information to be recorded;

said bias signal generating means, said recording means, said playback means, said detecting means and said control means cooperatively forming a servo loop for controlling said composite bias signal to a given magnitude.

24. A bias control apparatus for a recording system, comprising:

(a) signal source means for generating a first signal and a second signal, the frequency of said first signal being different from that of said second signal;

(b) bias signal generating means coupled to said signal source means for providing a composite bias signal containing a frequency component of said second signal and another frequency component at a frequency higher than that of said frequency component of said second signal;

(c) recording means coupled to said bias signal generating means and to said signal source means for recording information of said composite bias signal and said first signal into a recording medium;

(d) playback means coupled through said recording medium to said recording means for taking out a third signal containing a signal component corresponding to said first and second signals from said recording medium;

(e) detecting means coupled to said playback means for detecting a fourth signal corresponding to the amplitude component of said second signal from said third signal; and (f) control means coupled to said detecting means and to said bias signal generating means for changing a magnitude of said composite bias signal based on said fourth signal. said bias signal generating means including:

a bias signal oscillator for generating a bias signal with a higher frequency than those of said first and second signals;

amplitude-modulating means coupled to said bias signal oscillator and said signal source means for amplitude-modulating said bias signal by said second signal to provide said composite bias signal; and said recording means including second amplitude-modulating means for amplitude-modulating said composite bias signal by said first signal to provide said information to be recorded;

said bias signal generating means, said recording means, said playback means, said detecting means and said control means cooperatively forming a servo loop for controlling said composite bias signal to a given magnitude; and p1 (g) holding means coupled to said control means for shutting off said servo loop after said composite bias signal reaches said given magnitude and for holding said composite bias signal at said given magnitude after said servo loop is shut off.

* * * * *